Figure 1:
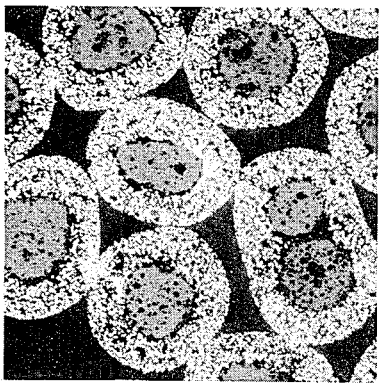

United States Patent Office 3,494,785
Patented Feb. 10, 1970

3,494,785
PROCESS FOR APPLYING METAL AND METALLIC ALLOY COATINGS ON SIEVE SIZE DISCRETE NUCLEAR FUEL PARTICLES
Harold N. Barr and Albert L. Picha, Baltimore, Md., assignors, by mesne assignments, to Teledyne, Inc., Los Angeles, Calif., a corporation of Delaware
Filed Dec. 7, 1962, Ser. No. 244,238
Int. Cl. C23c 13/02; B44d 1/02
U.S. Cl. 117—100                                    26 Claims This invention relates to metal coated nuclear fuel particles and, more particularly, to a method whereby metal coatings having more desirable physical characteristics than hertofore possible may be applied to such particles and whereby metallic alloy coatings which had heretofore been impossible to apply to such particles may be now produced. In addition, this invention relates to new types of metal and metallic alloy coated fuel particles which are made possible through the process disclosed herein.

It has generally been the practice to form cermet dispersion type nuclear fuel elements from mixtures of powderous matrix metal and powderous fissionable material. These mixtures are subjected to various metallurgy techniques such as compacting, sintering, etc., to form a densified body which in some cases is provided with a metal cladding. While this type of fuel element has been successfully utilized in numerous applications, there are inherent limitations associated with such elements which prevent operation being obtained therefrom which approaches the theoretical obtainable optimum. Most of these limitations result from the inability to obtain a truly uniform distribution of the fuel particles within the matrix metal.

More recently certain engineers and scientists have recognized the advantages which may be realized by employing metal coated nuclear fuel particles in the fabrication of cermet dispersion type nuclear fuel elements. Metal coated fuel particles insure effective separation of the individual fuel particles within the matrix metal and permit a relatively uniform distribution of the fuel and matrix materials to be obtained. This uniform distribution of the matrix metal and fuel particles greatly improves the structural strength of the fuel element and, further, permits the thermal conductivity thereof to be greatly improved without increasing the proportion of matrix metal to fuel particles. In addition this uniform distribution within the fuel element aids in the mechanical retention of the fuel and reduces vaporization losses of fuel at high temperatures. By utilizing a metal coating which is not reactive with the fuel particle, fuel particles can be employed with a matrix metal with which they would otherwise be reactive, thereby permitting fuel elements to be formed from new combinations of matrix metals and fuel particles. Greater protection is also provided to the fuel particles from the coolant used in the reactor and which, in some cases, may be reactive with the fuel particle material.

Because of these many advantages to be realized by the use of metal coated nuclear fuel particles, considerble effort is being expended by both Government and industry to perfect methods by which they may be produced. Probably the method most frequently considered has been deposition by chemical vapor decomposition. Many single metal coatings have been formed by this process which exhibit good uniformity and good surface coverage; however, this coating process is not practical for the application of binary and ternary alloy systems. Various investigations have also been conducted of electroplating and chemical reduction (electroless) plating methods of coating fuel particles; however, here again neither of these methods has proved suitable for depositing metallic alloy coatings.

All of the metal coatings applied by the chemical vapor decomposition electroplating and electroless plating techniques have exhibited a full density characteristic. Since the metal coated nuclear fuel elements are normally subjected to powder metallurgy techniques to produce various types of dispersion fuel elements, it is highly desirable to produce coatings having relatively low densities—a result not heretofore possible.

It is therefore a primary object of the present invention to provide a method whereby nuclear fuel particles may be provided with metallic alloy coatings. In addition, a process is provided which permits metal and metallic alloy coatings of varying densities to be applied to nuclear fuel particles. This invention also provides new types of metal and metallic alloy coated nuclear fuel particles.

Briefly, this invention comprises spraying nuclear fuel particles with a slurry including metal oxides or metal hydrides and subsequently reducing that portion of the metal oxides or metal hydrides thereby deposited on the fuel particles to substantially pure metal form. The temperatures employed in the reducing step may be varied to control the density of the metal or metallic alloy coating.

The first step in the process of this invention is to weigh out the desired amount of the compound/compounds of the metal/metals from which the coating on the nuclear fuel particles is to ultimately consist. These metal compounds must be chemically stable under normal conditions but readily reducible to substantially pure metal form. Two types of metal compounds have been found suitable for use in the process of this invention, oxides and hydrides, and the size of the individual compound particles should be between approximately 0.5 and 2.0 microns. While the oxides of metals with which it is most frequently desired to coat nuclear fuel particles may normally be employed, it is necessary in certain cases to utilize the hydride of the metal when the oxide of that particular metal is not chemically stable under normal conditions or readily reducible. For instance, while zirconium oxide cannot easily be reduced to form elemental zirconium, zirconium hydride is readily reducible in vacuo at elevated temperatures.

Exemplary of the typical metal oxides which may be used in practicing this invention are $FE_2O_3$, NiO, $Cr_2O_3$, $MoO_3$, $WO_3$, $ReO_3$, $SnO_2$, CoO and CuO. Similarly, combinations of these same compounds may be mixed in order to ultimately form various metallic alloy coatings. For instance, a very useful product which may be produced by this process is stainless steel coated fuel particles. The first step in producing such a product would be to form a mixture consisting of 70–83 w/o $Fe_2O_3$, 0–17 w/o NiO and 8–18 w/o $Cr_2O_3$. The symbol "w/o" is used herein to denote weight percent. Exemplary of the typical metal hydrides which may be used in practicing this invention are $TiH_2$, $ZrH_2$ and hydrides of various zirconium alloys.

The particular oxides and hydrides listed above are mentioned by way of example only and it is not intended that this invention be limited to the use of only those particular compounds.

After the desired compound/compounds, either oxides or hydrides, have been weighed, they are mixed with a suitable liquid such as water. Since impurities existing in the water may subsequently cause impurities to be formed in the final metal coating produced by this process, better results may be obtained by the use of distilled water. In addition, since the oxide or hydride particles will subsequently be separated from the liquid body to which they are added at this step of the process (as will be explained in more detail hereinafter), the process of this invention may be accelerated if desirable by using a liquid consisting of a mixture of water and methyl alcohol which has a faster evaporation rate than water alone. In some cases it may be desirable to use methyl alcohol alone as the liquid body.

At this point in the process it is desirable to add a dispersing agent to the mixture of liquid and metal compounds to facilitate suspension of the metal compounds within the liquid body. This dispersion agent may be a deflocculant such as Darvan No. 7 produced by the R. T. Vanderbilt Company of New York, N.Y. Sodium ligno sulphates such as Marasperses produced by the Marathon Chemical Company of Rothschild, Wis., may also be satisfactorily employed for this purpose.

In addition, at this point in the process it is desirable to add a binder to the mixture to facilitate the binding together of the particles of the metal compound/compounds when they are subsequently separated from the liquid and dried. The particular binder to be employed must be soluble in water and may, for instance, be polyvinyl alcohol.

Uniform dispersion of the metal oxide or metal hydride particles is then effected within the liquid to form a homogeneous slurry. This may be accomplished by the use of a ball mill Model No. 764A of the U.S. Stoneware Company, Akron, Ohio, or any other suitable blender. When using a ball mill for this operation, impurities in the final coating may be reduced to an absolute minimum by employing balls therein formed from the same metal or metallic alloy as the final coating to be deposited on the nuclear fuel particles. For instance, if fuel particles are to be coated with stainless steel, best results will be obtained by employing stainless steel balls in the ball-milling apparatus. It has been found desirable to ball mill most slurries for a period of from 9 to 72 hours.

The homogeneous slurry thus produced is then sprayed onto the fuel particles until the metal oxide or metal hydride coating of the required thickness has been deposited thereon. This may most readily be accomplished by the use of a heated rotating drum and a spray gun such as Model No. EGA manufactured by The DeVilbiss Company of Toledo, Ohio. Excellent results have been obtained using a 24 inch diameter, open end, aluminum drum rotated at a speed of approximately 2 revolutions per minute. This rotating drum was heated by eight 375-watt infrared lamps to accelerate the drying of the spray coated fuel particles. An eight-inch vibrating screen was mounted within the drum near the top thereof to sift the fuel particles and permit them to drop through the spray. The inside surface of the rotating drum was provided with a V-shaped baffle to collect the particles after they had passed through the spray and to return them to the vibrating screen for recycling. A number of pins mounted on the surface of the vibrating screen served to separate any particles which had become agglomerated during spraying and to facilitate a more uniform coating build-up on the particles by continuously removing excess surface material. This recycling process is continued until a predetermined weight increase of the fuel particles, which is dependent upon the desired ratio of fuel particles to matrix metal in the final fuel element and upon whether or not the total amount of the matrix metal of the final fuel element is to be coated onto the fuel particle, has been realized. The coating efficiency, i.e., that percentage of the total coating material sprayed which is actually deposited on the fuel particles will vary with the size of the particular fuel particles employed and the amount of fuel particles being sprayed. It has been found that the coating efficiency increases as the fuel particle size is decreased and as the amount of fuel particles being sprayed is increased. The coating rate, i.e., the build-up rate of the coating material on the individual fuel particles, is indirectly proportional to the amount of fuel particles being coated and directly proportional to the spraying rate.

Table I has been included to show the results of a typical coating experiment in which a quantity of 0.5 kilogram of 100–150 micron uranium dioxide fuel particles was coated with a mixture of 71 w/o $Fe_2O_3$, 11 w/o NiO and 18 w/o $Cr_2O_3$ to produce 60 w/o stainless steel coating efficiency in proportion to coating weight as recoating efficiency in proporation to coating weight as reflected therein is due to the corresponding increase in size and surface area of the particles. The data in Table I illustrates that the coating rate was essentially constant over the entire coating period and it is theorized that the increase in coating efficiency was apparently balanced by the increase in surface area.

After it has been determined that the proper amount of metal oxide or metal hydride material has been deposited on the fuel particles, the oxide or hydride coating is reduced to substantially pure metal foam. This may be accomplished in the case of metal oxide coatings by inserting the coated fuel particles into a hydrogen atmosphere furnace, a cracked ammonia atmosphere furnace or a carbon monoxide atmosphere furnace. The reduction of metal hydride coatings may be effected by subjecting the coated particles to elevated temperatures in vacuo.

As previously noted, the density of the metal or metallic alloy coatings may be controlled by varying the temperature and time duration of the reducing step. This is amply

TABLE 1

| Time (hours) | Oxide coating deposited (grams per 100 grams $UO_2$) | Equivalent stainless steel content (w./o.) | Coating efficiency (percent) | Coating rate[1] (percent wt. increase/hr.) | Coating thickness (microns/hour) | Total coating thickness (microns) |
| --- | --- | --- | --- | --- | --- | --- |
| 1.25 | 12 | 8 | 30 | 6.8 | 1.80 | 2.25 |
| 2.50 | 24 | 15 | 30 | 7.0 | 1.80 | 4.50 |
| 3.38 | 48 | 25 | 40 | 10.2 | 2.50 | 8.4 |
| 4.13 | 46 | 31 | 40 | 11.0 | 2.66 | 11.0 |
| 6.25 | 97 | 41 | 40 | 11.0 | 2.40 | 15.0 |
| 8.75 | 135 | 49 | 42 | 11.0 | 2.30 | 20.2 |
| 11.25 | 175 | 55 | 48 | 11.0 | 2.20 | 24.8 |
| 13.75 | 218 | 60 | 54 | 11.4 | 2.10 | 29.0 |

Figure 2:
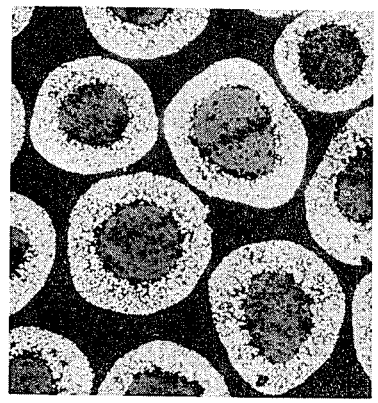
Figure 3:
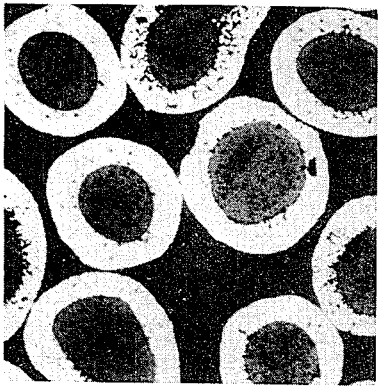

[1] Coating rate is based on the equivalent stainless steel content of the coating oxide.

illustrated by FIGURES 1 through 3. Each of these figures show $UO_2$ fuel particles magnified 150 times which have been provided with stainless steel coatings of varying densities by the process of this invention. The fuel particles shown in each of the FIGURES 1 through 3 comprise 71 w/o stainless steel on 100–150 micron diameter spherical $UO_2$. In each case the original mixture of oxide compounds consisted of 71 w/o $Fe_2O_3$, 11 w/o NiO and 18 w/o $Cr_2O_3$ and reduction of the mixed oxide compound to stainless steel was accomplished in a hydrogen atmosphere furnace over a two-hour period. Reduction of the coatings shown in FIGURES 1, 2 and 3 was effected at temperatures of 1000° C., 1100° C. and 1260° C. respectively. It will be noted that the density of the stainless steeal coating increased as the reduction temperature was increased until a virtually full density coating was formed at a temperature of 1260° C. (FIGURE 3). The process of this invention may be employed to form various types of metal and metallic alloy coatings ranging in densities from approximately 40 percent up to and including full density.

The process of this invention may be utilized to effectively vary the size and weight of numerous coatings to meet specification requirements. Coating densities and surfaces may be varied through heat treatment from a low density soft coating with high surface area to a high density soft coating with low surface area. As previously indicated the lower density coatings are preferred for powder metallurgy processing as they inherently flow better under pressure and exhibit high sinterability when subjected to heat treatment. In some cases, such as corrosion protection, high density coatings may be preferred and are readily obtainable by the process disclosed herein. By utilizing the process of this invention, heretofor unobtainable metal alloy coatings may be provided on nuclear fuel elements. In addition, for the first time multiple metal and/or metallic alloy coatings of varying densities may be applied on nuclear fuel elements.

Any nuclear fuel particles normally utilized in the fabrication of cermet dispersion type nuclear fuel elements may be provided with metal and metallic alloy coatings by the process of this invention. Illustrative of the types of fuel particles which may be coated are uranium dioxide, uranium dicarbide, uranium alloys, uranium carbide and uranium oxide-thorium oxide. Naturally a particular type of fuel particle should not be directly coated with a metal or metallic alloy with which it is reactive.

Figure 4:
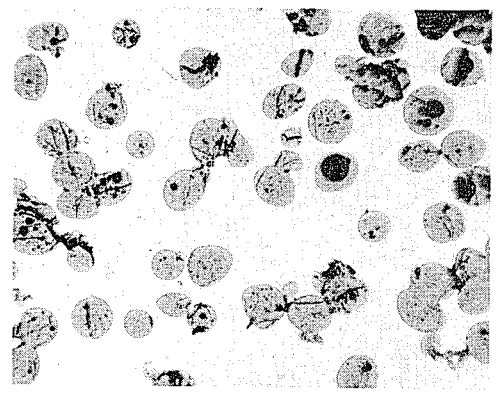
Figure 5:
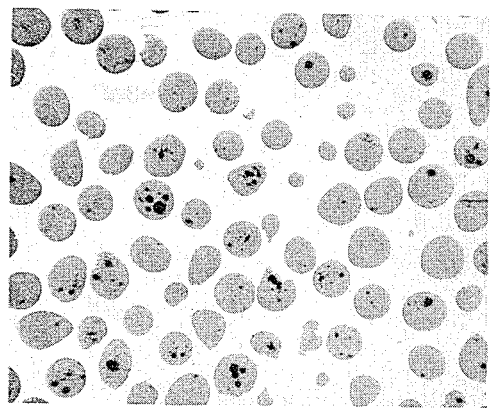

The advantages which are obtainable by forming cermet dispersion type nuclear fuel elements from metal and metallic alloy coated fuel particles is clearly illustrated by a comparison of FIGURES 4 and 5 which show the microstructures of different fuel elements magnified 75 times. The fuel element shown in FIGURE 4 was fabricated from uncoated spherical $UO_2$ particles, while the fuel element illustrated in FIGURE 5 was fabricated from stainless steel coated spherical $UO_2$ fuel particles formed in accordance with the process of this invention. With the exception of this one difference, the fuel elements shown in FIGURES 4 and 5 were produced by identical processes and under identical conditions. It is readily apparent that greater uniformity of fuel particle distribution within the fuel element has been obtained in the fuel element shown in FIGURE 5. The matrix metal therein is dispersed between adjacent fuel particles in every instance thereby greatly improving the thermal conductivity of the element. The structural strength of the fuel element has been increased and mechanical retention of the fuel within the matrix material has been greatly enhanced.

It has been found that the use of metal oxides and metal hydrides in lieu of metal powders as the source of metal in forming coatings on nuclear fuel particles offers a number of very important advantages. The hydrides and oxides are commercially available in fine particle sizes and mechanical means may be employed to further reduce the size of these particles if desirable whereas the pure metal is ductile and, consequently, extremely difficult to reduce by mechanical means. The metal oxide and hydride powders are easily suspended and deflocculated in liquids such as distilled water to form homogeneous dispersions which may be subsequently sprayed utilizing standard commercially available equipment. Upon reduction to substantially pure metal form, these powders exhibit a high sinterability and can be densified at lower temperatures than commercially available powders of the elemental metal.

A number of examples are listed below to further illustrate the various types of coating which may be applied on nuclear fuel particles by the process of the present invention. The slurry used in each example listed was ball-milled for a period of approximately 18 hours at 115 revolutions per minute in a ball mill Model No. 764A manufactured by the U.S. Stoneware Company of Akron, Ohio, employing ⅜ inch diameter stainless steel balls. In each example the slurry was sprayed on the fuel particles with a spray gun Model No. EGA marketed by The DeVilbiss Company of Toledo, Ohio, while cycling them through the spray by the use of a 24-inch diameter, open end, aluminum drum rotated at approximately two revolutions per minute and maintained at a temperature of approximately 190° F.

EXAMPLE I

Nuclear fuel particles:
    Type _____ $UO_2$.
    Weight _____ 100–150 micron diameter.
    Size _____ 500 grams.
Slurry:
    (1) Distilled water _____ 88 cc.
    (2) $Fe_2O_3$—
        Approximate size _____ 1 micron.
        Weight _____ 71 grams.
    (3) NiO—
        Approximate size _____ 1 micron.
        Weight _____ 11 grams.
    (4) $Cr_2O_3$—
        Appropriate size _____ 1 micron.
        Weight _____ 18 grams.
    (5) Polyvinyl alcohol _____ 1 gram.
    (6) Darvan #7 _____ 2 grams.
Oxide coating:
    Spraying rate _____ 80 grams per hour.
    Time _____ 13.6 hours.
    Weight _____ 1090 grams.
Reduction process:
    Method _____ Hydrogen furnace.
    Temperature _____ 1200° C.
    Time _____ Two hours.
Final coating:
    Type _____ Stainless steel.
    Thickness _____ 29 microns.
    Weight _____ 763 grams.
    Approximate density _____ 85 percent.

EXAMPLE II

Nuclear fuel particles:
    Type _____ $UO_2$.
    Size _____ 100–150 micron diameter.
    Weight _____ 500 grams.
Slurry:
    (1) Distilled water _____ 88 cc.
    (2) NiO—
        Approximate size _____ 1 micron.
        Weight _____ 100 grams.
    (3) Polyvinyl alcohol _____ 1 gram.
    (4) Darvan #7 _____ 2 grams.
Oxide coating:
    Spraying rate _____ 80 grams per hour.
    Time _____ 12.5 hours.
    Weight _____ 1000 grams.
Reduction process:
    Method _____ Hydrogen furnace.
    Temperature _____ 800° C.
    Time _____ Two hours.
Final coating:
    Type _____ Nickel.
    Thickness _____ 26 micron.
    Weight _____ 785 grams.
    Approximate density _____ 75 percent.

EXAMPLE III

Nuclear fuel particles:
    Type _____ $UO_2$.
    Size _____ 100–150 micron diameter.
    Weight _____ 100 grams.
Slurry:
    (1) Distilled water _____ 50 cc.
    (2) $MoO_3$—
        Approximate size _____ .5 micron.
        Weight _____ 100 grams.
    (3) Polyvinyl alcohol _____ 1 gram.
    (4) Darvan #7 _____ 2 grams.
Oxide coating:
    Spraying rate _____ 10 grams per hour.
    Time _____ 8.6 hours.
    Weight _____ 86.6 grams.

EXAMPLE III.—Continued

Reduction process:
- Method _____ Hydrogen furnace.
- Temperature _____ 800° C.
- Time _____ Two hours.

Final coating:
- Type _____ Molybdenum.
- Thickness _____ 10 microns.
- Weight _____ 56 grams.
- Approximate density ____ 60 percent.

EXAMPLE IV

Nuclear fuel particles:
- Type _____ $UO_2$.
- Size _____ 100–150 micron diameter.
- Weight _____ 100 grams.

Slurry:
- (1) Distilled water _____ 50 cc.
- (2) $WO_3$—
  - Approximate size _____ .5 micron.
  - Weight _____ 100 grams.
- (3) Polyvinyl alcohol ___ 1 gram.
- (4) Darvan #7 _____ 2 grams.

Oxide coating:
- Spraying rate _____ 16 grams per hour.
- Time _____ 7.5 hours.
- Weight _____ 120 grams.

Reduction process:
- Method _____ Hydrogen furnace.
- Temperature _____ 1100° C.
- Time _____ Two hours.

Final coating:
- Type _____ Tungsten.
- Thickness _____ 10 micron.
- Weight _____ 96 grams.
- Approximate density ____ 60 percent.

EXAMPLE V

Nuclear fuel particles:
- Type _____ $UO_2$.
- Size _____ 100–150 micron.
- Weight _____ 200 grams.

Slurry:
- (1) Distilled water _____ 175 cc.
- (2) $ZrH_2$—
  - Approximate size _____ 2 micron.
  - Weight _____ 100 grams.
- (3) Polyvinyl alcohol ___ 1 gram.
- (4) Darvan #7 _____ 2 grams.

Hydride coating:
- Spraying rate _____ 40 grams per hour.
- Time _____ 7.6 hours.
- Weight _____ 306 grams.

Reduction process:
- Method _____ In vacuo at $10^{-5}$ mm. Hg.
- Temperature _____ 1000° C.
- Time _____ One hour.

Final coating:
- Type _____ Zirconium.
- Thickness _____ 33 micron.
- Weight _____ 150 grams.
- Approximate density ____ 50 percent.

This invention may be practiced or embodied in other ways without departing from the spirit or essential character thereof. The process and embodiments of the invention described herein are therefore illustrative and not restrictive, the scope of the invention being indicated by the appended claims, and all changes which come within the meaning and range of equivalency of the claims are intended to be embraced therein.

The invention claimed is:

1. A process for applying metal and metallic alloy coatings on sieve screen size discrete nuclear fuel particles comprising the steps of:
   (a) depositing a coating of substantially uniform thickness of particles of at least one stable metal compound on said sieve screen size discrete fuel particles, said metal compound being selected from a group consisting of the oxide and the hydride of a metal from which said coating is to be formed and said metal compound being reducible to substantially pure metal form; and
   (b) reducing said particles deposited on said nuclear fuel particles to substantially pure metal form.

2. The process of claim 1 wherein said metal compound coatings and said metal and metallic alloy coatings are of multimicron thickness.

3. A process for applying metal and metallic alloy coatings on sieve screen size discrete nuclear fuel particles comprising the steps of:
   (a) spraying said sieve screen size discrete fuel particles with a slurry, said slurry including oxide particles of at least one metal from which said coating is to be formed substantialy uniformly dispersed in a liquid, to deposit an oxide coating of substantially uniform thickness on said fuel particles; and
   (b) reducing said oxide coating on said fuel particles to substantially pure metal form.

4. The process of claim 3 wherein said oxide particle coating and said metal and metallic alloy coatings are of multimicron thickness.

5. A process for applying metal and metallic alloy coatings on sieve screen size discrete nuclear fuel particles comprising the steps of:
   (a) adding oxide particles of at least one metal from which said coating is to be formed to a body of liquid;
   (b) ball-milling the mixture of said oxide particles and said liquid to form a slurry of substantially uniform dispersion;
   (c) spraying said sieve screen size discrete fuel particles with said slurry to deposit a coating of substantially uniform thickness of said oxide particles thereon; and
   (d) reducing said coating to substantially pure metal form.

6. The process of claim 5 wherein said liquid is selected from a group consisting of methyl alcohol and combinations thereof.

7. The process of claim 5 wherein said reducing step includes firing said oxide particles deposited on said fuel particles in a hydrogen atmosphere furnace.

8. The process of claim 5 wherein said reducing step includes firing said oxide particles deposited on said fuel particles in a carbon monoxide atmosphere furnace.

9. The process of claim 5 wherein said reducing step includes firing said oxide particles deposited on said fuel particles in a cracked ammonia atmosphere furnace.

10. The process of claim 5 wherein said slurry includes additionally a dispersing agent.

11. The process of claim 10 wherein said dispersing agent is a deflocculant.

12. The process of claim 10 wherein said slurry includes additionally a binder.

13. The process of claim 12 wherein said binder is polyvinyl alcohol.

14. The process of claim 5 wherein said oxide particles are selected from a group consisting of $Fe_2O_3$, NiO, $Cr_2O_3$, $MoO_3$, $WO_3$, $ReO_3$, $SnO_2$, CoO, CuO and combinations thereof.

15. The process of claim 5 wherein said fuel particles are selected from a group consisting of uranium dioxide, uranium alloys, uranium carbide, uranium dicarbide and uranium oxide-thorium oxide.

16. The process of claim 15 wherein said fuel particles are uranium dioxide.

17. A process for applying metal and metallic alloy coatings on sieve screen size discrete nuclear fuel particles comprising the steps of:
  (a) spraying said sieve screen size discrete fuel particles with a slurry, said slurry including hydride particles of at least one metal from which said coating is to be formed substantially uniformly dispersed in a liquid, to deposit a hydride coating of substantially uniform thickness on said fuel particles; and
  (b) reducing said hydride coating on said fuel particles to substantially pure metal form.

18. The process of claim 17 wherein said hydride coating and said metal and metallic alloy coatings are of multimircon thickness.

19. A process for applying metal and metallic alloy coatings on sieve screen size discrete nuclear fuel particles comprising the steps of:
  (a) adding hydride particles of at least one metal from which said coating is to be formed to a body of liquid;
  (b) ball-milling the mixture of said hydride particles and said liquid to form a slurry of substantially uniform dispersion;
  (c) spraying said sieve screen size discrete fuel particles with said slurry to deposit a coating of substantially uniform thickness of said hydride particles on said fuel particles; and
  (d) reducing said coating of said hydride particles to substantialy pure metal form.

20. The process of claim 19 wherein said hydride particles are selected from a group consisting of zirconium hydride, hydrides of zirconium alloys and titanium hydride.

21. The process of claim 19 wherein said fuel particles are selected from a group consisting of uranium dioxide, uranium alloys, uranium carbide, uranium dicarbide, and uranium oxide-thorium oxide.

22. The process of claim 19 wherein said reducing step includes maintaining said coated fuel particles in vacuo while subjecting them to high temperatures.

23. The process of claim 19 wherein said slurry includes additionally a dispersing agent.

24. The process of claim 23 wherein said dispersing agent is a deflocculant.

25. The process of claim 23 wherein said slurry includes additionally a binder.

26. The process of claim 25 wherein said binder is polyvinyl alcohol.

References Cited

UNITED STATES PATENTS

| | | | |
|---|---|---|---|
| 3,053,683 | 9/1962 | Yolles | 117—107.2 |
| 1,741,477 | 12/1929 | Pfiffner | 117—160 |
| 2,328,101 | 8/1943 | Rosenblatt | 117—160 |
| 3,117,914 | 1/1964 | Wright et al. | 176—69 |
| 3,121,047 | 2/1964 | Stoughton et al. | 176—69 |
| 2,244,053 | 6/1941 | Comstock | 75—225 X |
| 2,351,798 | 6/1944 | Alexander | 117—22 |
| 2,512,455 | 6/1950 | Alexander | 117—22 |
| 2,570,248 | 10/1951 | Kelley | 117—22 |
| 2,735,787 | 2/1956 | Eastman et al. | 117—100 |
| 2,786,801 | 3/1957 | McKinley et al. | 117—100 |
| 2,860,598 | 11/1958 | Loesche | 117—100 |
| 3,001,893 | 9/1961 | Kreuchen et al. | 117—22 |
| 3,030,226 | 4/1962 | Heaton et al. | 117—51 |
| 3,069,292 | 12/1962 | Alexander et al. | 117—100 |
| 3,192,042 | 6/1965 | Spacil | 117—100 X |
| 3,213,162 | 10/1965 | Johnson et al. | 117—100 X |
| 3,223,523 | 12/1965 | Adler | 117—100 X |
| 2,483,075 | 9/1949 | Truesdale | 117—100 |
| 2,610,118 | 9/1952 | Drapeau et al. | 117—100 X |
| 2,853,398 | 9/1958 | Mackin et al. | 117—100 X |
| 2,967,811 | 1/1961 | Flint | 117—100 |
| 3,082,084 | 3/1963 | Alexander et al. | 117—100 X |
| 3,122,595 | 2/1964 | Oxley | 117—100 X |
| 3,147,154 | 9/1964 | Cole et al. | 117—100 X |
| 3,214,288 | 10/1961 | McGraw | 117—160 X |

FOREIGN PATENTS 648,293  1/1951  Great Britain.

OTHER REFERENCES

Fuel Element Fabrication, June 1962, vol. 2, pp. 261–263.

Nuclear Metallurgy, vol. VI, November 1959, p. 93.

Nuclear Metallurgy, vol. IV, November 1957, pp. 131–134.

Parkes, G. D. Mellor's Modern Inorganic Chemistry, 1951, p. 563.

Perry, John H., Chemical Engineer's Handbook, 2nd edition, 1941, p. 1572.

WILLIAM D. MARTIN, Primary Examiner

E. J. CABIC, Assistant Examiner

U.S. Cl. X.R.

117—160; 176—67, 91